(12) United States Patent
Zurmuehl

(10) Patent No.: US 8,694,912 B2
(45) Date of Patent: Apr. 8, 2014

(54) HOME AND AREA PAGES

(75) Inventor: Martin Zurmuehl, Muehlhausen (DE)

(73) Assignee: SAP AG, Walldorf (DE)

( * ) Notice: Subject to any disclaimer, the term of this patent is extended or adjusted under 35 U.S.C. 154(b) by 2398 days.

(21) Appl. No.: 10/936,776

(22) Filed: Sep. 8, 2004

(65) Prior Publication Data

US 2006/0053040 A1    Mar. 9, 2006

(51) Int. Cl.
 *G06F 3/048*    (2013.01)
 *G06F 3/00*    (2006.01)

(52) U.S. Cl.
 USPC .......................................... 715/789; 715/745

(58) Field of Classification Search
 USPC ................................................ 715/789, 745
 See application file for complete search history.

(56) References Cited

U.S. PATENT DOCUMENTS

2001/0034676 A1* 10/2001 Vasic .............................. 705/30
2004/0268228 A1* 12/2004 Croney et al. ................. 715/505

* cited by examiner

*Primary Examiner* — Haoshian Shih
(74) *Attorney, Agent, or Firm* — Finnegan, Henderson, Farabow, Garrett & Dunner, L.L.P.

(57) ABSTRACT

A method of generating a user interface for an application includes storing a profile for a user of the application, where the profile contains information that relates to a function of the user in an organization and personal information for the user, selecting elements to include in the user interface based on the profile, and building the user interface using the elements.

24 Claims, 9 Drawing Sheets

HOME AND AREA PAGES

TECHNICAL FIELD

This patent application relates generally to processing by a digital computer and, more particularly, to generating home and area pages for an end-user.

BACKGROUND

Traditionally, an organization, such as a company, contains various department and systems that track and maintain employee-related information, such as benefits and the like. More recently, intranet technology has given employees the ability to access such information directly from their desktops. An intranet, typically, is a network based on transmission control protocol/Internet protocol (TCP/IP) that is accessible only to an organization's members, employees, or others with authorization. An intranet's Web sites look and act just like any other Web sites and are used to share information via pages containing hypertext transfer protocol (HTTP) links to other pages.

One of the benefits of Intranets and other Web-based technology is that employees no longer have to learn how to user different computer programs to access different types of information—a single, commonly understood protocol could instead be used.

SUMMARY

In general, in one aspect, the invention is directed to method of generating a user interface for an application. The method includes storing a profile for a user of the application, where the profile contains information that relates to a function of the user in an organization and personal information for the user, selecting elements to include in the user interface based on the profile, and building the user interface using the elements. Corresponding computer programs and apparatus are also provided, along with one or more of the following features.

The elements may relate to services available to the user. The profile may contain a role of the user, and the elements that are selected may correspond to the role. The application may be a self-services application, and the role may be one of an employee and a manager. The elements may be selected based on at least one factor in addition to the profile, which may include one or more of time and business data relating to the user. The user interface may comprise one or more hyperlinked Web pages.

The method may include receiving an indication of an event associated with the user interface, obtaining a visual component for the user interface based on the event, and building a subsequent user interface using the visual component. The visual component may be obtained by obtaining an identity of the visual component from a configuration file associated with the user interface, and retrieving the visual component. The subsequent user interface may be built by instantiating the visual component along with any components associated with the elements. The event may include an input to the current user interface, the event comprising at least one of navigation from a previous user interface and an action that affects display of a selected component.

In general, in another aspect, the invention relates to a method of generating a user interface for an application. The method includes storing a profile for a user of the application, where the profile contains information that relates to a function of the user in an organization and personal information for the user, and defining visual components for the application, where the visual components comprise objects and data needed to generate the user interface. The method also includes defining an invisible component for the application, where the invisible component defines a navigation path to the user interface, where the invisible component has access to a configuration file that identifies the visual components, and where the configuration file is based, at least in part, on the profile of the user. In response to an event, a layout of the user interface is obtained from the configuration file via the invisible component, where the layout comprises the visual components. The user interface is built using the visual components. Corresponding computer programs and apparatus are also provided.

Other features and advantages described herein will be apparent from the description, the drawings, and the claims.

DESCRIPTION OF THE DRAWINGS

FIG. 5 is an example of a UI that was generated by the floorplan manager, and that contains a roadmap pattern.

FIGS. 8 and 9 show pages that are accessible from the home and area page of FIG. 7.

Like reference numerals in different figures indicate like elements.

DETAILED DESCRIPTION

Figure 5:
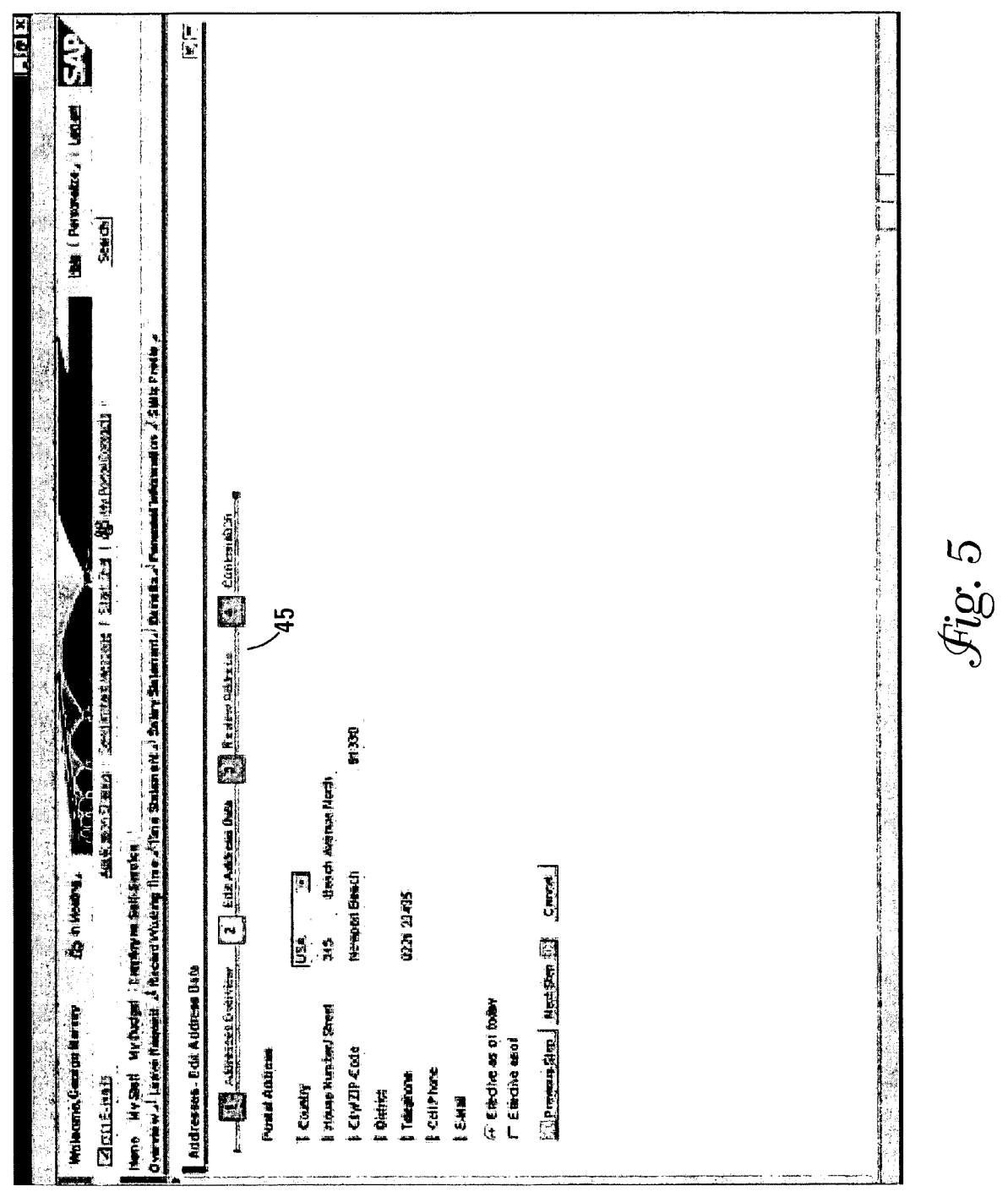

The home and area pages described herein may be implemented in any context. In the embodiment described herein, they are implemented in a self-service architecture. A self-service architecture includes an application and associated software that allows one or more people to perform a task or set of tasks. Examples of applications that have a self-service architecture include an employee self-service (ESS) application and a manager self-service (MSS) application. An ESS application may allow an employee to enter information into a centralized database. For example, an ESS application may allow the employee to changes a name, address, benefits, and the like via a user interface (UI), such as the Web page in FIG. 5. The information in the Web page is then transmitted to the centralized database over a network or other medium. An MSS application is similar to an ESS application, except that an MSS application is limited to use by a management professional. An MSS application may allow a management professional to effect changes relating to management of employees, their status within an organization, and the like.

Figure 6:
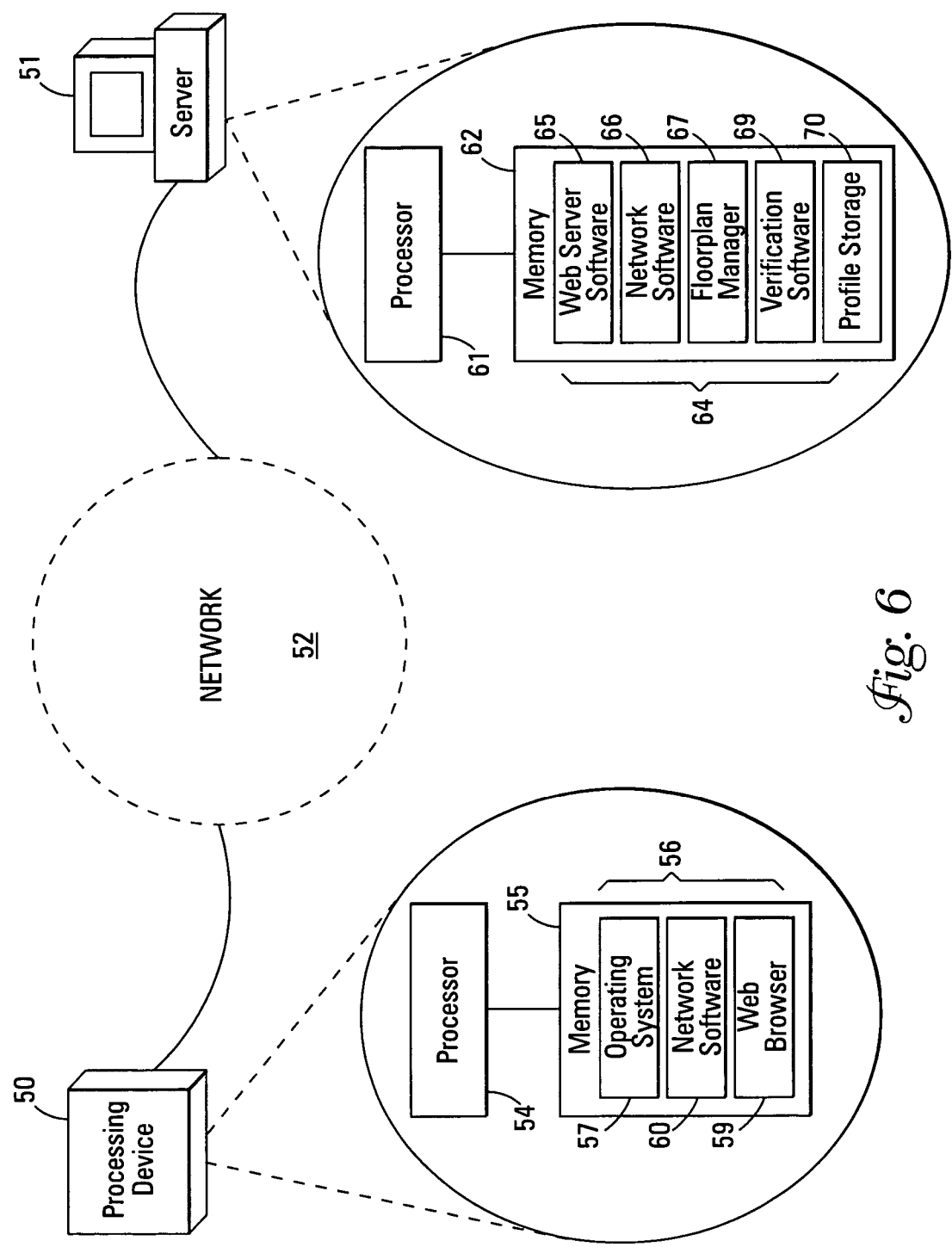
FIG. 6 shows hardware on which home and area pages generated by the floorplan manager may be implemented.

FIG. 6 shows hardware on which the self-service architecture may be implemented. The hardware includes a processing device 50, such as a personal computer, a laptop computer, a personal digital assistant, or a cellular telephone. Processing device 50 is in communication with a server 51. The communication may be via a network 52, including media such as Ethernet or wireless. Any protocols may be used to effect communication. Examples of such protocols include transmission control protocol/internet protocol (TCP/IP) for the network medium and wireless fidelity (Wi-Fi) for wireless. Network 52 may be any type of local area network (LAN) (e.g., an intranet) and/or wide area network (WAN), which may or may not include the Internet.

As shown in FIG. 6, processing device 50 (also called a "portal") contains a processor 54 and a memory 55. Memory 55 contains software 56 including, but not limited to, an operating system 57, such as Microsoft® Windows®, and a Web browser 59, such as Microsoft® Internet Explorer®. Network software 60 allows processing device 50 to communicate with server 51. Processor 54 executes software 56 to enable an end-user at processing device 50 to access the home and area pages described herein.

Server 51 also contains a processor 61 and a memory 62. Memory 62 contains software 64, including web server software 65 to provide Web pages, including the home and area pages described herein. Memory 62 contains network software 66, which enables server 51 to communicate over network 52, and floorplan manager (FPM) 67 (described below), which may be used to build the home and area pages. In this regard, the embodiment described herein uses FPM 67 to build the home and area pages. It is noted, however, that any appropriate software (Web-based or otherwise) may be used in place of FPM 67 to build the home and area pages. Memory 62 also contains verification software 69 to verify the identity of an end-user logging into server 51 from, e.g., processing device 50, and profile storage 70 to store profiles of end-users.

An end-user may register with server 51 from processing device 50, or the end-user may have a pre-established account with server 51. For example, an employer may establish an account for an employee, which the employee can access via a user identifier (ID) and a password, or the like. Server 51 stores a profile for the end-user. Information for the profile may be obtained during registration; the information may be stored by whoever sets up the account; the information may be obtained based on usage patterns; and/or the information may be stored after account set-up by the end-user. The information may be employment-related and non-employment-related.

The profile may store a "role" of the end-user in an organization. The role may be the end-user's (in this example, the employee's) function within the organization. For example, the employee may be a programmer, a sales manager, a supervisor, or the like. The employee's role, in part, dictates the content of home and area pages for the employee. This concept is described in more detail below.

The profile may also contain other information, such as the employee's work and home addresses, benefits enrollment, personal circumstances (e.g., recent marriage or child birth), travel information, calendar, objectives, appraisals, reviews, vacation time, account information, and the like. Basically, the profile can contain any information that relates to the end-user. The profile is used to customize the content of the home and area pages. That is, the home and area pages are dynamic in the sense that their content, including services provided thereon, may be displayed (or not) based on the content of the profile. For example, if an employee's profile indicates the birth of a new child or a recent marriage, new tax forms may be made available to the employee via services on the home and area pages. The home and area pages are also dynamic in the sense that their content may vary over time. For example, benefits enrollment services may be provided at a specific time each year, or tax-related information may be provided at a particular time of the year.

The end-user's account may also be linked to databases (not shown) associated with an organization that employs the end-user. This linkage may make information available on an end-user's home and area page. For example, the information may notify the end-user of upcoming organizational events, or provide the end-user with more personalized information, such as when the end-user's paycheck is available for pickup.

Figure 7:
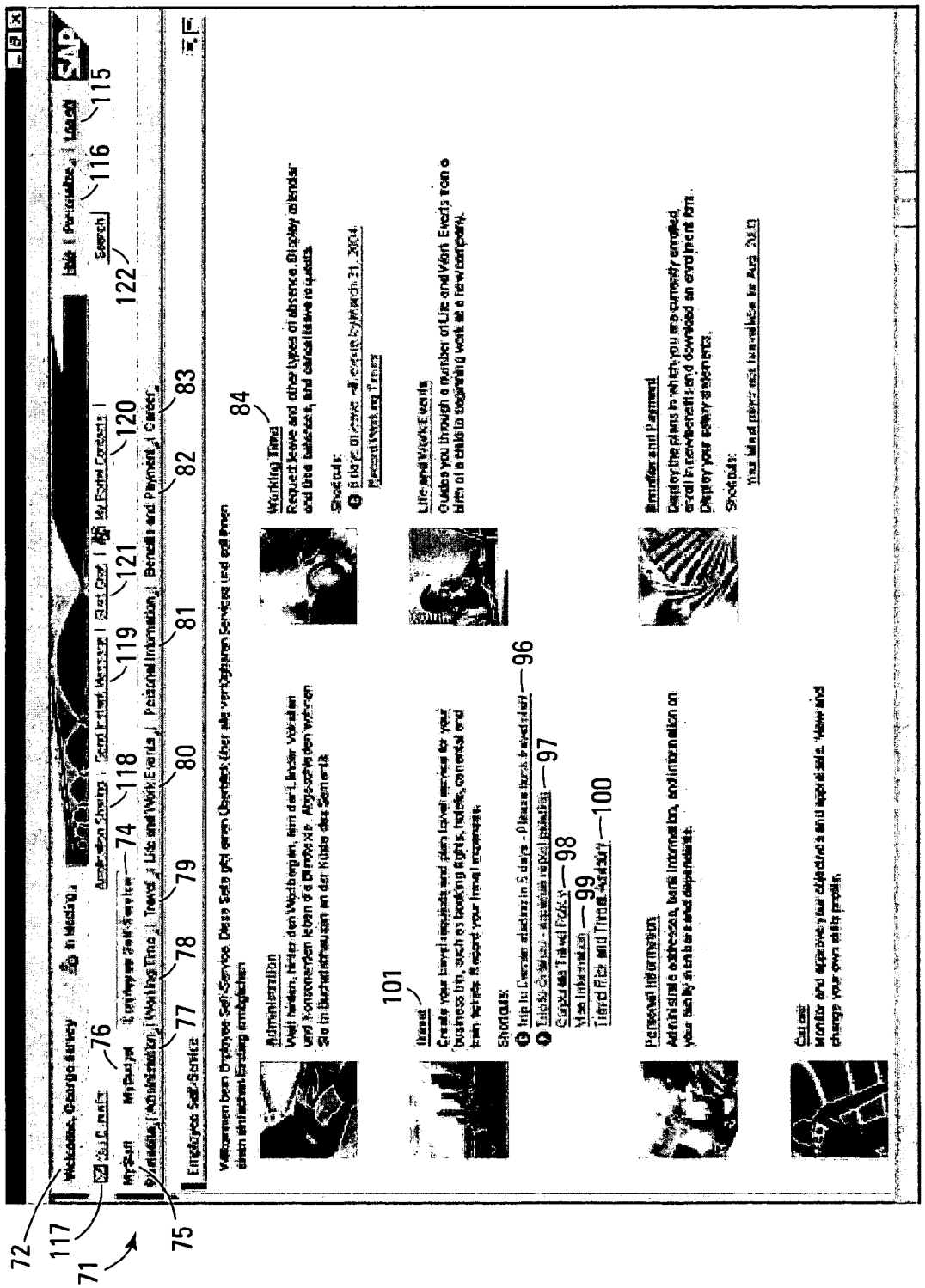
FIG. 7 shows an example of a home and area page.

FIG. 7 shows an example of a home and area page 71 for an end-user named "George Harvey" 72. Page 71 includes ESS 74. ESS 74 may be accessed via a tab. Other tabs, in this case Mystaff tab 75 and MyBudget tab 76. MyBudget tab 76 links the user to a page (not shown) containing budgetary information. Such a feature is particularly important for management professionals, who are required to maintain, and produce, based on a predetermined budget. MyStaff tab 75 links the user to a page (not shown) containing information relating to the end-user's staff.

Both MyBudget tab 76 and MyStaff tab 75 would typically only appear for management professionals, since they typically are the ones who need to deal with budgetary and staffing issues. Software (e.g., FPM 67) that builds the home and area pages determines whether an end-user is a management professional based on information in the end-user's profile (e.g., the end-user's "role"). Once that information is obtained by the software, FPM 67 builds home and area 71, e.g., in the manner described below in the section entitled "Floorplan Manager". This includes incorporating, as appropriate, MyBudget tab 76 and MyStaff tab 75 into home and area page 71, along with links to the appropriate pages and information contained therein.

ESS 74 also includes a number of services 77 to 83 that are available to the end-user. Display of these services is dynamic. That is, when the end-user logs into his account (or alternatively, simply accesses an appropriate Web page), FPM 67 selects and retrieves appropriate user interface elements based on information in the users' profile and other information, such as the time (e.g., day, month, year, etc.), that may affect the content of the home and area page 71. As above, once this information is retrieved, FPM 67 builds home and area page 71, e.g., in the manner described below, incorporating services 77 to 83.

Figure 8:
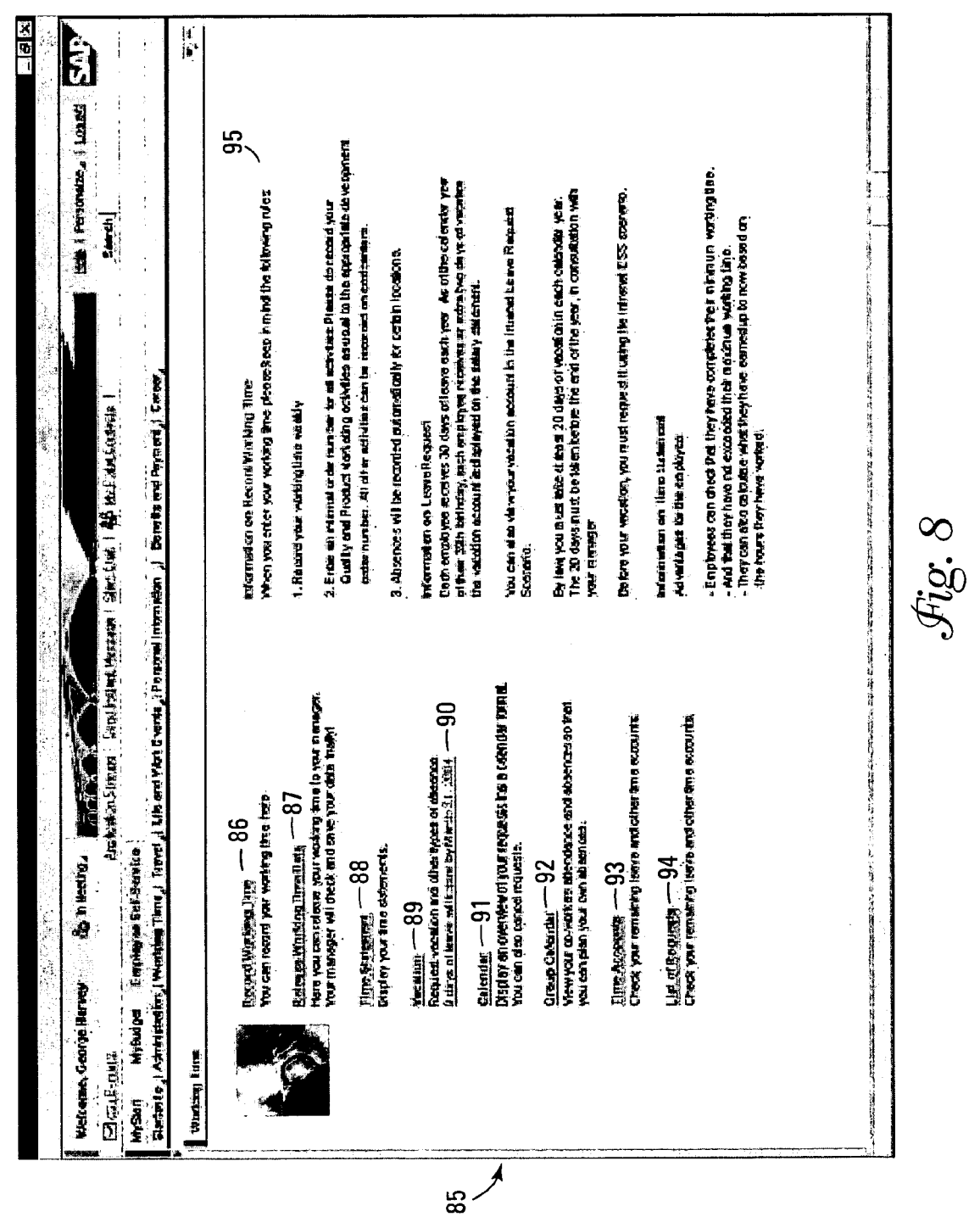

In home and area page 71, the services include Administration 77, Working Time 78, Travel 79, Life and Work Events 80, Personal Information 81, Benefits and Payment 82, and Career 83. As shown in FIG. 7, each service includes a link (e.g., link 84) to another page containing more information available from the service. As noted above, this information may be obtained via the user's profile and/or via access to one or more databases located within an enterprise. Clicking on link 84 under Working Time Service 78 causes page 85 (FIG. 8) to be displayed.

Page 85 includes links to services provided via Working Time 78 service. These services include a link 86 to a page that allows an employee to record working time, a link 87 to a page that allows the employee to release working time to a manager, a link 88 to display an employee's time statement, a link 89 for requesting vacation time (along with a shortcut link 90 to a page showing an amount of vacation time and its expiration date), links 91 and 92 to display time-related requests in calendar format, a link 93 to check remaining leave and other time-related accounts, and a link 94 showing time-related requests. Page 85 also includes an informational area 95 (which may, or may not, include a scroll bar for access to more information than cannot be displayed on a page— page 85 does not). Informational area 95 may contain information that describes the services available via links 86 to 94. Other information may also be provided, as appropriate.

Figure 9:
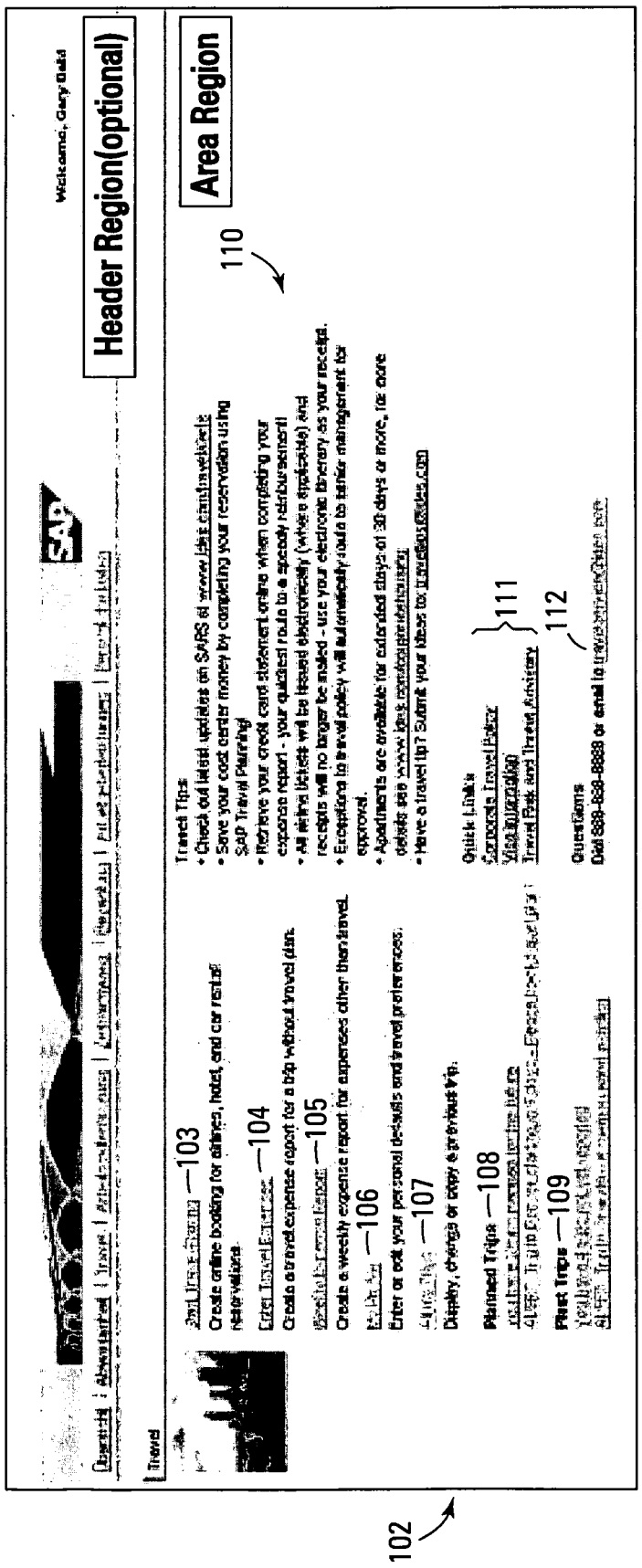

Referring back to FIG. 7, page 71 includes Travel 79 service. Travel 79 service also includes shortcut links relating to an upcoming trip to Denver 96, an upcoming trip to Orlando 97, corporate travel policy 98, visa information 99, and travel risk and threat advisory 100. Clicking on link 101 associated with Travel 79 service causes page 102 (FIG. 9) to be displayed. As was the case in page 85, page 102 includes links to pages that provide available services. For example, page 102 includes a link 103 for travel planning, a link 104 for entering travel expenses, a link 105 for generating a weekly expense report, a link 106 for reviewing and revising the end-user's travel profile (e.g., airline preferences, hotel preferences, travel time preferences, frequent flier number(s), etc.), a link 107 for displaying information relating to current trips, and areas relating to planned trips 108 and past trips 109. The planned trips 108 area provides links to information on upcoming trips and one or more "alerts" indicating activities that are required before, during or after the trip (e.g., booking travel plans). The past trips 109 area provides links to information on past trips, such as trips for which expense reports have not been submitted, and "alerts" relating, e.g., to pending expense reports (e.g., reimbursement not yet received).

As was the case above with respect to page 85, page 102 provides an informational area 110 that may be used to explain the services available on links to the left. In addition, appropriate shortcut links 111 may be provided, as well as telephone number(s) or e-mail address(es) 112, e.g., of travel agents or other travel-related personnel.

Administration 77 service provides links to information relating to administration of employees, budgets and the like. Life and Work Events 80 service provides links to information relating to events at home, e.g., the birth of a child, or at work, e.g., scheduled meetings and the like. Personal Information 81 service provides links to information relating to personal financial accounts, family members, children, and the like. Benefits and Payment 82 provides links to information relating to employee benefits, such as health, dental, 401K and the like. Career 83 service provides links to information relating to, e.g., employee reviews, skills, career goals and objectives, and the like. Although not shown in detail, pages relating to Administration 77, Life and Work Events 80, Personal Information 81, Benefits and Payment 82, and Career 83 services have similar structure and function to those described above for the Working Time 78 service and the Travel 79 service.

Referring back to FIG. 7, home and area page 71 may also include help option 114, a logoff option 115, and an option 116 to personalize the content of page 71. In this regard, typically, the content of the page 71 is dictated by information in the user's profile, extrinsic information such as time, and information provided by an employer. Should the user wish to edit the contents of page 71 manually, option 116 provides the user with this capability.

Home and area page 71 also includes a link 117 to retrieve and view electronic mail (e-mail) (e.g., from Microsoft® Outlook® or any other e-mail service), a link 118 that enables the end-user to share applications with other users, a link 119 for instant messaging, a link 120 showing portal contacts (e.g., "buddies"), and a chat link 121. A search option 122 allows the end-user to conduct and intranet or Internet search, as appropriate.

Although the home and area pages described above relate to an ESS (or MSS), similar pages can be used outside of the employment context. For example, home and area pages can be used by an academic institution to allow students to track course schedules, loan information, progress through a curriculum, university activities, and the like. Home and area pages could also be used in a medical context, e.g., by doctors or hospital patients, to allow them to track treatment options, diagnoses, patients care, etc. The home and area page concept has wide applicability, and nothing said herein is intended to limit the use of home and area pages to one particular field or endeavor.

Floorplan Manager

The FPM is software that builds displays for software applications, in this case, for the home and area pages described above. The FPM can standardize the "look and feel" of such applications by generating user interfaces that have substantially similar structures and that are navigable in substantially the same way. The FPM is described herein for an ESS; however, the FPM can be used to generate any type of home and area page (or other interface, for that matter).

UIs that comprise the home and area pages include individual screen elements. Examples of these elements include table controls, tools buttons, and hyperlinks. The screen elements form "patterns", such as a screen area to change the values of a table entry or a group of buttons to proceed or "step back" in an application. These patterns define common functions and UI elements designed for a specific task or, more often, for a specific group of intended users. This is referred to as application's "floorplan". The FPM can operate to ensure consistency among the floorplans of various pages, or it can simply be used to update the floorplans of home and area pages irrespective of consistency.

In this embodiment, each self-service application is a Web Dynpro application; however, the FPM may be used with other types of applications as well. Web Dynpro's approach to creating UIs enables a user to isolate concerns when building, changing, or extending an application. With Web Dynpro, a developer defines views to allocate screen space and determines what will appear on the end-user's screen by arranging basic UI elements. The views are strung together with navigational links to define a possible sequence of views the user will see. It is also possible to define nested views, or view sets, that divide a screen into smaller areas, each capable of showing one view at a time.

While views determine what an end-user sees on screen, a software controller handles actions that are invoked from the screen, such as clicking a button and selecting data in a table, or passes them on to other controllers so that the other controllers can handle them. The software controllers constitute active entities in the user interface. Any data managed in a Web Dynpro UI is attributed to some controller. The hierarchy of data that a controller "owns" is its context. For data to automatically travel from one controller to the other, it is possible to assign mappings between the contexts of different controllers. For other relationships, one may set bindings to define automatic, bi-directional data flow between some part of a context and some UI elements in a view's layout or some part of a model layer that encapsulates a backend system.

Each self-service application is defined by a starting point, meaning the window of the application that is displayed first. Once a first window of an application is visible, the behavior of the application, e.g., display of subsequent windows, depends on "events" initiated by the user and a system response thereto. As noted above, windows of Web Dynpro components may be comprised of multiple views. A self-service application may include several such views, e.g., one view for each (possible) step of an application floorplan. A self-service application uses assembled views called perspectives. A perspective defines the visual content of an application in a certain state, meaning which visual components are contained on a particular UI. In the context of the FPM, the UI of a self-service application is defined by the perspectives it contains and by possible navigation paths between these perspectives.

Figure 1:
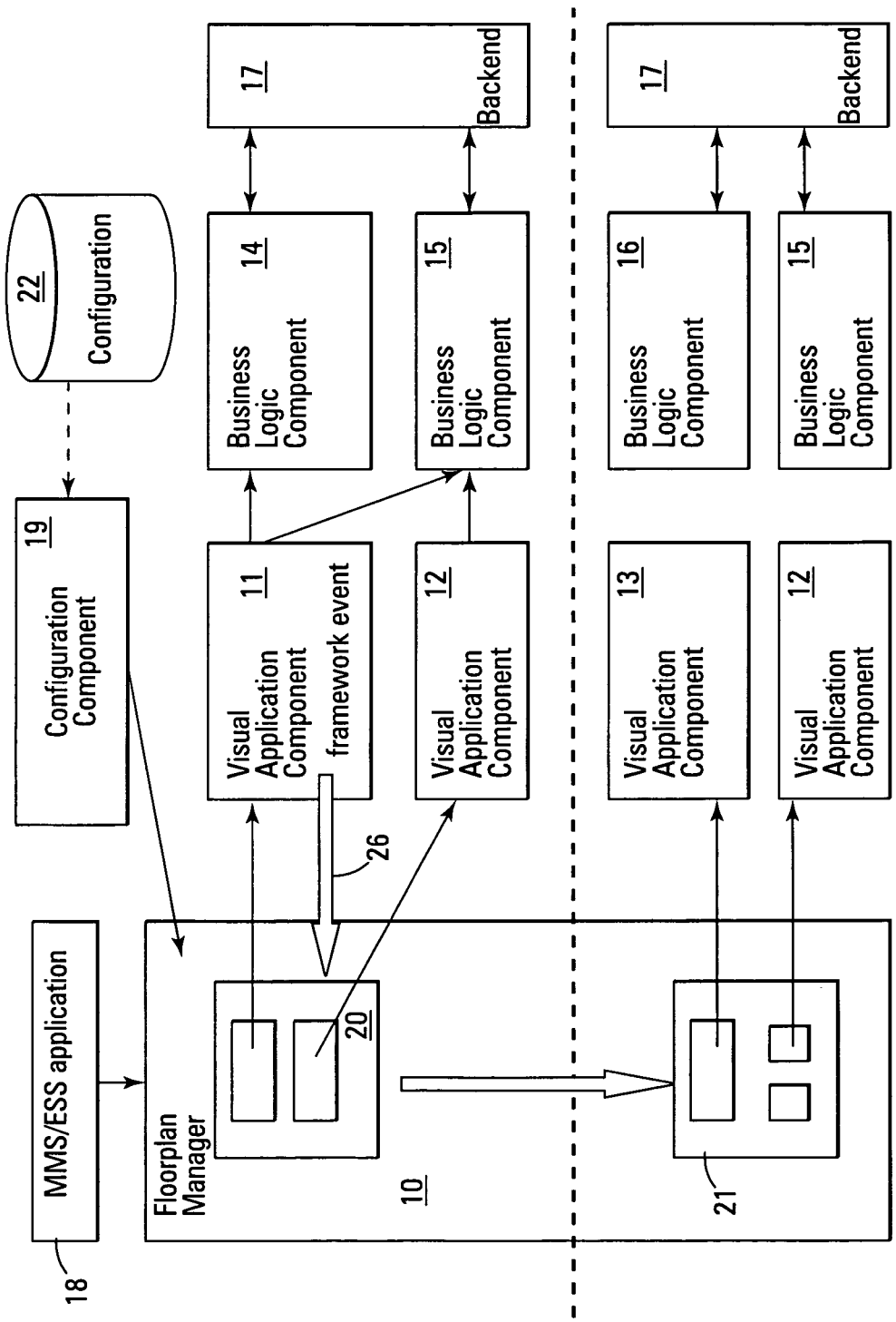
FIG. 1 is a block diagram of the architecture of the floorplan manager in conjunction with a framework (or, "floorplan manager") event.

Referring to FIG. 1, FPM 10 defines the following types of UI components. Visual application components (VACs) 11, 12, 13. VACs are the building blocks of perspectives, and contain all objects, data, hyperlinks, images and other elements needed to generate a perspective. VACs display data (e.g., text, menus, buttons, navigational tools, etc.), handle user input, and trigger FPM events. (As described below, an FPM event is an event that usually {but not necessarily} results in a transition between two perspectives, which is effected via an FPM-implemented process known as an "event loop".)

In addition to visual components, a self-service application includes at least two non-visual, or "invisible", components: one to define navigation paths between perspectives of the application, and another one to handle business logic of the application. Business logic components (BLCs) 14, 15, 16 are invisible components that handle communication between the application and a backend system 17. The backend system includes one or more computer systems, e.g., servers, that contain data to present via application 18 and data that is input via application 18. BLCs 14, 15, 16 provide updated and/or new data to a VAC from the backend system, and vice versa. BLCs use one or more Web Dynpro models, prepare the system's backend to send data to the system frontend (e.g., a computer system that is running application 18), and cause the system frontend to display the data as (or in) a VAC.

Configuration component(s) (CCs) 19 are one or more components that define perspectives and navigation paths of a self-service application. The FPM obtains the layout of a perspective 20 from the CC and uses this information to build a subsequent perspective 21. The CCs obtain the perspective layouts from a configuration file 22, which may be associated with application 18. The configuration file defines VACs for application 18, the components that make up the VACs, and the navigational relationships between VACs (e.g., which events trigger display of which VACs). A CC may take into account specific VACs that are to be included in a UI definition based on information in the user's profile. To standardize the UIs of different types of applications, CC 19 may store and use the same VACs for different applications, which FPM 10 may use to implement substantially similar (or exactly the same) functionality on applications that would otherwise have entirely different types of UI's. In this way, the FPM can be used to build UIs that are at least partly consistent across different applications.

In this embodiment, VACs, BLCs and CCs are implemented as Web Dynpro components; however, this is not a requirement. It is also noted that the functionality of one or more of the components, e.g., CC 19, may be implemented within the FPM itself. The following software routines are implemented in the FPM.

onInit: This routine is called when a VAC is initialized. This routine enables a VAC to identify and store a current interface to the FPM, and to identify and register one or more BLCs that are to be used by the VAC to access backend system 17.

onCleanup: This routine is called once for each VAC when application 18 shuts down. This routine is used to remove unnecessary data and data locks from the VACs.

onFlush: This routine is called at the beginning of an FPM event loop. The onFlush routine is used to cause the VAC to transfer new or updated data from the VAC to an appropriate BLC if such data has not already been transferred automatically via context mapping. In this regard, if all the fields of a VAC are directly or indirectly mapped to BLC, their values are automatically updated. In this case, the onFlush routine need not be called by the FPM.

onHide: This routine is called in an FPM event loop when a current perspective changes and a VAC is closed. The routine hides (i.e., makes invisible) designated VACs. The VACs being "hidden" should be in a consistent state, as described below, when the onHide routine is called. The routine isConsistent (also described below) is called to ensure consistency among the VACs.

onBeforeOutput: This routine is called in an FPM event loop whenever a new perspective is built. This routine performs visualization-specific operations, such as calculating the value of a screen field that exists locally (as a convenience for the user), but that is not stored in a backend database.

onEvent: This routine is called for every FPM event except for exit events and cancelled selection change events (both defined below). This routine notifies VACs that an event is taking place. If a VAC cannot perform event-specific operations so that the event can be processed correctly, the VAC notifies the onEvent routine, and instructs it to jump to the end of a current FPM event loop (described in detail below). In this case, the next perspective will not be built in response to a framework event. The FPM may issue a warning message to the user at this point.

onEventCompleted: This routine is called for every FPM event that reaches the onEvent routine. This routine notifies the FPM when and if an event has been processed successfully. If one of the visible VACs in a current perspective was not capable of processing the event correctly, the FPM is notified accordingly.

isDirty: This routine is called for instantiated VACs at the beginning of a selection change event loop and at the end of an FPM event loop (or, simply "event loop"). This routine causes VACs to return information about whether the data they contain has already been saved, and may be used in preventing unintentional loss of data. Since this routine is called often, it is preferable not to perform time consuming checks in this routine. One way of avoiding such time consuming checks is to flag a VAC as "dirty" whenever its fields change, and remove the "dirty flag" when a save event has been processed for the VAC.

isConsistent: This routine is called for VACs that are to be hidden at the end of an event loop. This routine causes VACs to return information about whether the data they contain is consistent, meaning that the data for a current perspective can be processed, and viewed in, a subsequent perspective. A typical example is a series of perspectives to collect data for a complex object, in which the object is saved in a last step of an event loop. If no checks for consistency were made in preceding perspectives, saving the data might fail in the last step. The user would then have to go back step-by-step to the perspective that contained the data that was responsible for the inconsistency.

As noted above, an event usually results in a transition between two UI perspectives, such as perspectives 20 and 21 of FIG. 1. In this regard, generally speaking, Web Dynpro applications are event-driven programs. Visual elements of an application, such as buttons, check boxes, and edit controls, communicate with each other by initiating events and reacting to events received through the Web Dynpro framework. Some events only have consequences inside the component that owns the screen element raising the event. Examples of such events include, but are not limited to, scrolling up and down a table of a table control and switching the visibility of some screen elements to avoid screen clutter. These events are defined as local events. They are handled by the Web Dynpro framework, and are not typically handled by the FPM, at least in this embodiment. What this means is that VACs are updated locally, not through the FPM.

Figure 2:
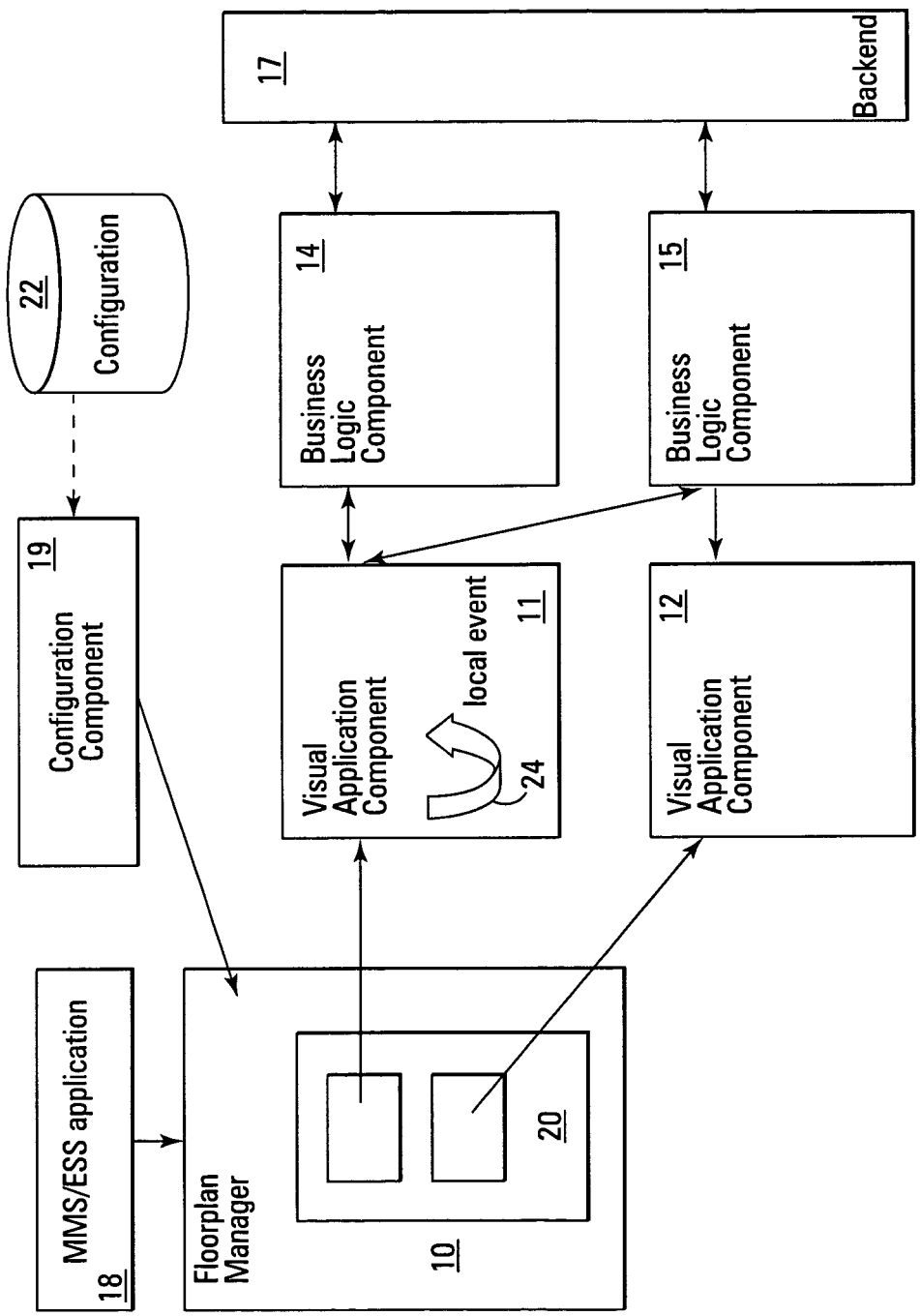
FIG. 2 is a block diagram of an architecture of the floorplan manager in conjunction with a local event.

For example, in FIG. 2, VAC 11 receives a local event 24. VAC 11 does not transmit the event to FPM 10, but rather processes the local even on its own. That is, VAC 11 updates itself without reference to FPM 10. Data displayed in, and input to, VAC 11 may be retrieved from/transmitted to back-end system 17 via BLC 14 and/or BLC 15, as shown.

Some events affect components outside the component (e.g., the VAC) that owns the screen element (e.g., button, toolbar, scrollbar, etc.) raising the event. Such events include various types of data selection events where another component (e.g., a BLC) retrieves data from a backend system, navigation events where a perspective changes or is replaced by another perspective, and user events where an action inside a VAC influences graphical elements and/or data can be seen in another VAC. An example of such an event includes changing the main selection in one VAC and updating corresponding details in another VAC. Events such as these are called framework events, or FPM events.

Instead of processing an FPM event itself, a self-service application's VAC notifies the FPM of the event. This triggers an FPM "event loop" and causes the FPM to perform the following tasks (although not necessarily in the following order): (1) notify all VACs of the current perspective and perform checks or actions based on the "type" of the framework event; (2) delete VACs that are no longer required as a result of the event; (3) obtain and initialize new VACs; and (4) build the next perspective or refresh the current perspective using the new VACs. During this operation, the FPM, not the application, is responsible for generating the perspectives (e.g., the UIs) displayed by the application.

Figure 3:
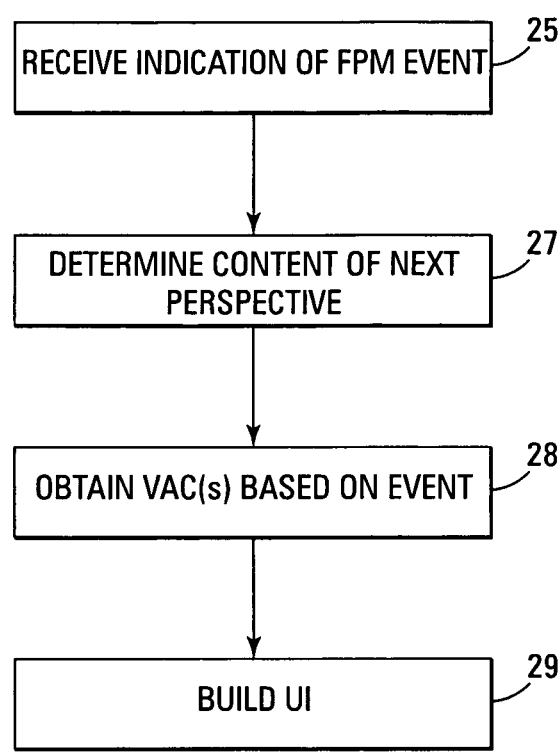
FIG. 3 is a flowchart showing a process for updating a UI via the floorplan manager.
Figure 4:
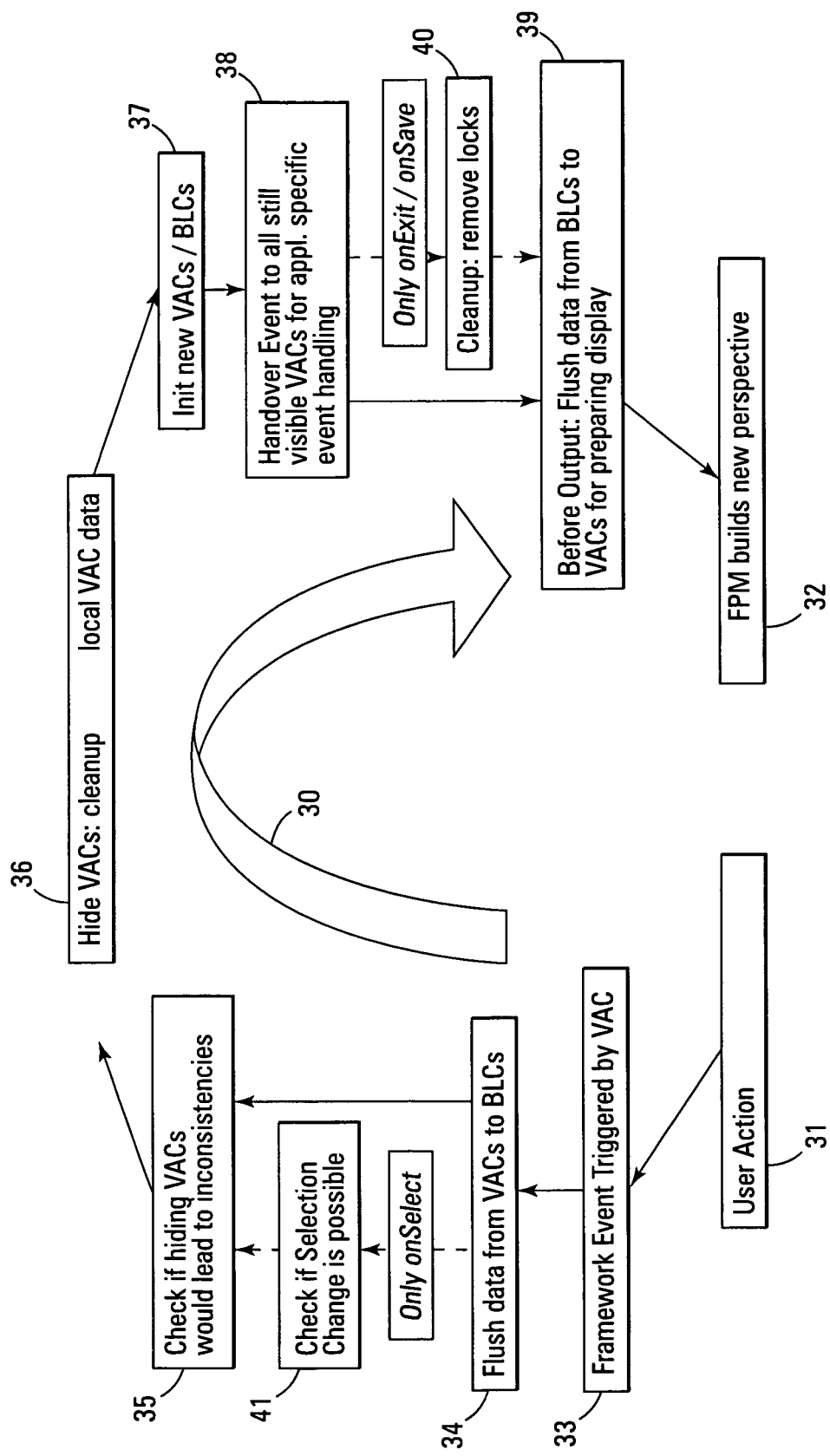
FIG. 4 is a diagram of a floorplan manager event loop, which shows a more detailed process than that of FIG. 3 for updating a UI via the floorplan manager.

Referring to FIGS. 1 and 3, the general process performed by FPM 10 to build a new perspective is as follows. (A more detailed implementation is shown in FIG. 4.) FPM 10 receives (25) an indication 26 of an FPM event from VAC 11. The event may be a navigation event that results in a change from VAC 11 (to, e.g., another VAC or, alternatively, to an update of VAC 11). FPM 10 determines (27), using CC 19, which elements of VAC are to be updated and/or if an additional VAC is to be displayed in a next perspective 21. In this example, a new VAC 13 is to be displayed and VAC 11 is to be removed. As such, FPM 10 obtains (28), from CC 19, the new VAC 13 that corresponds to the event, and builds (29) a new perspective 21 using that VAC. In that new perspective, VAC 11 is replaced by VAC 13 and VAC 12 remains. As shown in FIG. 1, new VAC 13 connects to backend system 17 through BLC 17.

The process of FIG. 3 may be implemented in an FPM event loop 30. FIG. 4 shows an overview of an FPM event loop 30. The event loop shows actions performed by one embodiment of the FPM in response to an event. As shown, the event loop starts in the lower-left corner with a user action 31 and ends in the lower-right corner when a new perspective is built 32. Depending on the "type" of the FPM event, the FPM might skip some of the actions shown in the event loop. Also, some actions in the event loop may be "vetoed" by application 18. These are actions in which a VAC may notify the FPM that the current state of the VAC does not allow the event loop to be performed. For example, if application data from a VAC has been modified and not saved, the FPM may interrupt the event loop and display a warning that the unsaved data might be lost if the event loop were to proceed to its completion without first saving the unsaved data.

Different "types" of framework events lead to the FPM processing the event loop in different ways. A "user" event starts an event loop. The user event can be an application-specific event that is communicated between visible VACs in a current perspective. A user event can include clicking on a button on a UI, navigating to a new UI (e.g., a new Web page), or the like, which can result in a change of perspective.

A "save" event starts an event loop to save all modified or created UI elements. The save event is a special version of a user event, which causes the self-service application to save data. The save event is triggered after the user has modified UI elements (e.g., screen objects) and saves the modified elements.

A "preview" event is a special version of a user event, which allows a user to preview changes before they are saved.

A "selection change" event is an event that is triggered when a UI selection, such as a selected skill in a profile, changes. In response to a selection change event, the FPM checks every VAC to determine if the VAC has unsaved data. If a VAC has unsaved data, the VAC "vetoes" the selection change and the FPM displays a warning message, in response to which the user may discontinue the event loop.

An "exit" event" corresponds to exiting from, or shutting-down, an application. In response to an exit event, the FPM notifies all active components, including VACs and BLCs, that the application is about to shut-down. In turn, the components remove all locks on objects they have accumulated over time. The components also perform any necessary "clean-up" operations (e.g. deleting unsaved data), and shut down.

Described below are different operations that the FPM performs in response to different types of framework events. Most of the operations that the FPM performs are performed on an visible VAC. However, this need not always be the case.

The following definitions apply for the description below. Instantiated VACs comprise all VACs that the FPM has ever instantiated since an application was started. Visible VACs comprise all VACs that are currently visible on a UI of the application. Closing VACs comprise VACs that are hidden at the end of a current event loop if the event loop ends with a change of perspective. Opening VACs are VACs that are instantiated during the current event loop and that are visible at the end of the event loop if the event loop ends with a change of perspective.

User Event

Referring to FIG. 4, the FPM starts an event loop in response to a user action 31 that triggers 33 an FPM event in a VAC. In response, the FPM calls the routine onFlush for all currently visible VACs. onFlush gives those VACs the opportunity to transfer 34 (i.e., flush) locally-stored data to a corresponding BLC. The FPM checks the navigation path from the current perspective to a next perspective in order to determine which VACs (closing VACs) will be hidden when the event is processed successfully. This check is made via CC 19 (FIG. 1), which consults configuration file 22. For closing VACs, the FPM calls the routine isConsistent to find out if the closing VACs can be hidden 35. If any of the closing VACs returns false, meaning that they cannot be hidden, the event loop jumps to the end and calls onBeforeOutput and isDirty at all visible VACs. At this point, the FPM may issue a warning to the user. The event loop may then end or proceed depending upon the user's response to the warning. If all closing VACs return the value true, meaning that all closing VACs can all be hidden, the event loop continues by calling the onHide routine for the closing VACs in order to hide 36 those VACs.

The FPM retrieves and initializes 37 opening VACs and BLCs by calling onInit. The identities of new/updated VACs correspond to the user event. Those VACs are retrieved from configuration file 22 by CC 19. The FPM notifies 38 all visible VACs of the event by calling the onEvent routine. The VACs will use this information to update or refresh their displays in the next perspective. The visible VACs may initiate a jump to the end of the event loop by returning a value false, meaning that the VACs cannot process the event successfully. This, however, would not happen until all visible VACs have been notified of a result of onEvent by calling onEventCompleted. The FPM then calls the routine onBeforeOutput for all visible VACs to be used in next perspective, which gives each such VAC the opportunity to update (i.e., flush) 39 local data from appropriate BLCs. Thereafter, the FPM builds 32 the new perspective from the visible VACs.

Variations in processing the event loop can result from application vetoes. For example, if a VAC contains "inconsistent" data, the FPM jumps to the end of the event loop.

Save Event

Here, the FPM starts the event loop in response to an event that saves all data on a perspective. The event loop for this type of event is identical to the event loop for user events described above, except that at point 40, the FPM calls the onCleanup routine.

Preview Event

Here, the FPM starts the event loop in response to an event that displays data on a perspective for review prior to saving the data. The event loop for this type of event is identical to the event loop for user events described above.

Selection Change Event

Here, the FPM starts the event loop for an event that changes a leading object of an application. Before processing this type of event, the FPM asks all VACs whether there is unsaved data that would be lost by this change of selection 41. This is done by calling the method isDirty for all instantiated VACs. If one or more of the instantiated VACs return true on isDirty, meaning that the VAC contains unsaved data, it is up to the user to decide whether the event loop will be resumed or halted. If the event loop is resumed, processing continues, otherwise the onBeforeOutput routine is called and the event loop ends.

Exit Event

As the name suggests, this is not strictly an event type. Instead, it is used to stop the application and/or to navigate away from the application. An exit event may include hitting a "cancel" button, re-starting an application, returning to the application's home page, and/or navigating to one or more predefined links. In response to an exit event, the FPM calls the onCleanup routine at point 41 enabling the VACs and BLCs to perform data cleanup before they are closed.

The FPM also includes a Roadmap Pattern (ROP) and a Context Assistance Pattern (CAP). The ROP and the CAP are the "ornaments" of a perspective. Although the FPM is responsible for displaying the ROP and the CAP, the self-service application informs the FPM about the actual contents of the ROP and CAP. In this regard, each perspective usually corresponds to a certain step in the application roadmap. Therefore, the state of the roadmap may change whenever the perspective changes. The CAP might or might not be part of a particular perspective. For example, in a perspective for modifying data, a user might need assistance, in which case the CAP could be displayed.

To determine the current state of the ROP or CAP, the FPM calls the routines getROPState and getCAPState to obtain states from the application's configuration controller (getROPState to obtain a state for the ROP, and getCAPState to obtain a state for the CAP). Both of these routines pass a parameter to the configuration controller and expect a return type of class ROPState (the ROP's state) or CAPState (the CAP's state). An ROP state is defined by an array of ROP steps and information regarding which of these steps is currently active. Each ROP step is defined by a unique identifier (usually "1", "a", "2a" or similar), a text string, and an array of other ROP steps containing the possible sub-steps of this step. The ROP steps can be used to build an ROP, such as ROP 45 of FIG. 5.

A CAP state (not shown) is defined in much the same way as the ROP state. Instead of steps, however, a CAP is comprised of CAP items, which are defined by an identifier, a text string, and the VAC that is displayed when the CAP is activated by the user. A particular CAP state is defined by the list of CAP items (that is, the list of VACs that offer context assistance) and information about which of the CAP items is currently displayed.

Other Embodiments

The home and area pages are not limited to use with the hardware and software described herein; they may find applicability in any computing or processing environment and with any type of machine that is capable of running machine-readable instructions, such as a computer program.

The home and area pages can be implemented in digital electronic circuitry, or in computer hardware, firmware, software, or in combinations thereof. The home and area pages can be implemented via a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with the home and area pages can be performed by one or more programmable processors executing a computer program to perform the functions of the home and area pages. The method steps can also be performed by, and home and area pages can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The home and area pages can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the record extractor, or any combination of such back-end, middleware, or front-end components. The components of the system can be interconnected by any form or medium of digital data communication, e.g., a communication network. Examples of communication networks include a local area network ("LAN") and a wide area network (WAN"), e.g., the Internet.

The computing system can include clients and servers. A client and server are generally remote from each other and typically interact through a communication network. The relationship of client and server arises by virtue of computer programs running on respective computers and having a client-server relationship to each other.

The home and area pages are not limited to the implementations set forth herein. For example, the home and area pages may be used outside the context of the FPM and/or WebDynpro.

Elements of different embodiments may be combined to form another embodiment not specifically set forth above. Other embodiments not specifically described herein are also within the scope of the following claims.

What is claimed is:

1. A method of generating a user interface for an application, comprising:
    storing a profile for a user of the application, the profile containing information that relates to a function of the user in an organization and personal information for the user;
    selecting elements to include in the user interface based on the profile and a current date;
    dynamically updating the selected elements to include in the user interface based on an update to the profile and the current date; and
    building the user interface using the selected elements.

2. The method of claim 1, wherein the selected elements relate to services available to the user.

3. The method of claim 1, wherein the function comprises a role of the user; and wherein the elements that are selected correspond to the role.

4. The method of claim 3, wherein the application comprises a self-services application, and the role comprises one of an employee and a manager.

5. The method of claim 1, wherein the elements are selected based on at least one factor in addition to the profile and the current date.

6. The method of claim 5, wherein the at least one factor comprises business data relating to the user.

7. The method of claim 1, further comprising:
    receiving an indication of an event associated with the user interface;
    obtaining a visual component for the user interface based on the event; and
    building a subsequent user interface using the visual component.

8. The method of claim 7, wherein obtaining the visual component comprises:
    obtaining an identity of the visual component from a configuration file associated with the user interface; and
    retrieving the visual component; and wherein building the subsequent user interlace comprises instantiating the visual component along with any components associated with the selected elements.

9. The method of claim 7, wherein the event comprises an input to the user interface, the event comprising at least one of navigation from a previous user interface and an action that affects display of a selected component.

10. The method of claim 1, wherein the user interface comprises one or more hyperlinked Web pages.

11. A tangible computer-readable storage device storing program instructions that generate a user interface for an application according to a method, the method comprising:
    storing a profile for a user of the application, the profile containing information that relates to a function of the user in an organization and personal information for the user;
    selecting elements to include in the user interface based on the profile and a current date;
    dynamically updating the selected elements to include in the user interface based on an update to the profile and the current date; and
    building the user interface using the selected elements.

12. The computer program product of claim 11, wherein the selected elements relate to services available to the user.

13. The computer program product of claim 11, wherein the function comprises a role of the user; and wherein the elements that are selected correspond to the role.

14. The computer program product of claim 13, wherein the application comprises a self-services application, and the role comprises one of an employee and a manager.

15. The computer program product of claim 11, wherein the elements are selected based on at least one factor in addition to the profile and the current date.

16. The computer program product of claim 15, wherein the at least one factor comprises business data relating to the user.

17. The computer-readable storage device of claim 11, the method further comprising:
    receiving an indication of an event associated with the user interface;
    obtaining a visual component for the user interface based on the event; and
    building a subsequent user interface using the visual component.

18. The computer-readable storage device of claim 17, wherein obtaining the visual component comprises:
    obtaining an identity of the visual component from a configuration file associated with the user interface; and
    retrieving the visual component; and
    wherein building the subsequent user interface comprises instantiating the visual component along with any components associated with the selected elements.

19. The computer-readable storage device of claim 17, wherein the event comprises an input to the user interface, the event comprising at least one of navigation from a previous user interface and an action that affects display of a selected component.

20. The computer-readable storage device of claim 11, wherein the user interface comprises one or more hyperlinked Web pages.

21. A tangible computer-readable storage device storing program instructions that generate a user interface for an application according to a method, the method comprising:
    storing a profile for a user of the application, the profile containing information that relates to a function of the user in an organization and personal information for the user;

defining visual components for the application, the visual components comprising objects and data needed to generate the user interface;
defining an invisible component for the application, the invisible component defining a navigation path to the user interface, the invisible component having access to a configuration file that identifies the visual components, the configuration file being based on the profile of the user and a current date;
obtaining, in response to an event, a layout of the user interface from the configuration file via the invisible component, the layout comprising the visual components;
dynamically updating the visual components to include in the user interface based on an update to the profile and the current date; and
building the user interface using the visual components.

22. The method of claim 1, wherein, based on the current date, the selected elements include at least one of benefits enrollment services information and tax-related information.

23. The computer-readable medium of claim 11, wherein, based on the current date, the selected elements include at least one of benefits enrollment services information and tax-related information.

24. The computer-readable medium of claim 21, wherein, based on the current date, the selected elements include at least one of benefits enrollment services information and tax-related information.

* * * * *